US009563657B2

(12) United States Patent
Martins

(10) Patent No.: US 9,563,657 B2
(45) Date of Patent: Feb. 7, 2017

(54) GENERATING DATA QUERIES USING A GRAPHICAL SELECTION TREE

(75) Inventor: Joao Sousa Martins, San Lorenzo, CA (US)

(73) Assignee: International Business Machines Corporation, Armonk, NY (US)

(*) Notice: Subject to any disclaimer, the term of this patent is extended or adjusted under 35 U.S.C. 154(b) by 1329 days.

(21) Appl. No.: 12/350,768

(22) Filed: Jan. 8, 2009

(65) Prior Publication Data

US 2009/0177988 A1 Jul. 9, 2009

Related U.S. Application Data

(60) Provisional application No. 61/019,779, filed on Jan. 8, 2008.

(51) Int. Cl.
 *G06F 7/00* (2006.01)
 *G06F 17/30* (2006.01)

(52) U.S. Cl.
 CPC ... *G06F 17/30398* (2013.01); *G06F 17/30592* (2013.01)

(58) Field of Classification Search
 None
 See application file for complete search history.

(56) References Cited

U.S. PATENT DOCUMENTS 5,428,776 A * 6/1995 Rothfield
5,566,291 A * 10/1996 Boulton et al. .............. 715/709
5,893,125 A * 4/1999 Shostak ....................... 715/206
5,894,311 A * 4/1999 Jackson ....................... 345/440
6,208,985 B1 * 3/2001 Krehel .......................... 707/767
6,353,830 B1 * 3/2002 Yee et al.
6,381,605 B1 * 4/2002 Kothuri et al.
(Continued)

FOREIGN PATENT DOCUMENTS

WO  WO 0124049 A1 * 4/2001
WO  WO 2006048046 A1 * 5/2006

OTHER PUBLICATIONS

A tree-structure query interface for querying semi-structure data, Newman et al, Proceedings of the 16th International Conference on Scientific and Statistical Database Management (SSDBM'04), 2004.*

(Continued)

*Primary Examiner* — Augustine K Obisesan
(74) *Attorney, Agent, or Firm* — Shumaker & Sieffert, P.A.

(57) ABSTRACT

The disclosure relates to data retrieval in an enterprise system through use of a graphical selection tree. An exemplary device to implement and display such a selection tree includes one or more processors, and also a data selection component and a query engine that are each executable by the one or more processors. The data selection component, when operable, receives, within a graphical user interface (GUI), user input to select a predefined data metric, and displays, within the GUI, a selection tree containing graphical branches associated with a data dimension, wherein each branch corresponding to a data attribute within the data dimension. The query engine generates, for each branch in the selection tree that is selected, a data query to request data of the selected data metric that matches the data attribute corresponding to the selected branch. The query engine also is capable of sending each generated data query to a data storage system.

23 Claims, 13 Drawing Sheets

(56) References Cited

U.S. PATENT DOCUMENTS

| | | | |
|---|---|---|---|
| 7,523,462 B1* | 4/2009 | Nesamoney et al. | 719/318 |
| 7,580,938 B1* | 8/2009 | Pai et al. | |
| 7,774,249 B1* | 8/2010 | West et al. | 705/35 |
| 2002/0004793 A1* | 1/2002 | Keith, Jr. | 707/1 |
| 2002/0029221 A1* | 3/2002 | Lokken | 707/102 |
| 2002/0129009 A1* | 9/2002 | Jevons et al. | 707/3 |
| 2003/0169284 A1* | 9/2003 | Dettinger et al. | 345/708 |
| 2003/0187716 A1* | 10/2003 | Lee | 705/10 |
| 2003/0218640 A1* | 11/2003 | Noble-Thomas | 345/853 |
| 2004/0181543 A1* | 9/2004 | Wu et al. | 707/102 |
| 2004/0205473 A1* | 10/2004 | Fisher et al. | 715/500 |
| 2004/0250227 A1* | 12/2004 | Lin | 716/7 |
| 2005/0004911 A1* | 1/2005 | Goldberg et al. | 707/7 |
| 2005/0060647 A1* | 3/2005 | Doan et al. | 715/514 |
| 2005/0065964 A1* | 3/2005 | Ziemann et al. | 707/102 |
| 2005/0144191 A1* | 6/2005 | Chkodrov et al. | 707/102 |
| 2005/0177592 A1* | 8/2005 | Burzynski | 707/102 |
| 2005/0187907 A1* | 8/2005 | Wortendyke et al. | 707/3 |
| 2005/0192953 A1* | 9/2005 | Neale et al. | 707/4 |
| 2005/0224435 A1* | 10/2005 | Alter | 211/153 |
| 2005/0278475 A1* | 12/2005 | Karatal et al. | 711/100 |
| 2006/0041539 A1* | 2/2006 | Matchett et al. | 707/3 |
| 2006/0112070 A1* | 5/2006 | Ramos | 707/1 |
| 2006/0271884 A1* | 11/2006 | Hurst | 715/854 |
| 2006/0282789 A1* | 12/2006 | Kim | 715/764 |
| 2007/0234237 A1* | 10/2007 | Seemann | 715/853 |
| 2007/0250499 A1* | 10/2007 | Widdowson et al. | 707/5 |
| 2007/0288890 A1* | 12/2007 | Wells | 717/113 |
| 2008/0040382 A1* | 2/2008 | Morris et al. | 707/102 |
| 2008/0071769 A1* | 3/2008 | Jagannathan | 707/5 |
| 2008/0250000 A1* | 10/2008 | Wories et al. | 707/4 |
| 2008/0306910 A1* | 12/2008 | Singh | 707/3 |

OTHER PUBLICATIONS

A graphical query interface based on aggregation/generalization hierarchies, Weiland et al, Information System, vol. 18 No. 4 pp. 215-232, Jun. 1993.*

* cited by examiner

Select one or more items for your chart Value (Y-Axis):

| | Name | Description | Chart Type | |
|---|---|---|---|---|
| ☑ | Total Sum of Amount | | Group 1 ▼ | ▽ |
| ☐ | Avg Amt | | Line ▼ | ▽ |
| ☑ | Prev Amt | | Group 1 ▼ | ▽ |

502

Add a Second Y-Axis: ☑

Select one or more items for your chart values (Second Y-Axis):

| | Name | Description | Chart Type | |
|---|---|---|---|---|
| ☐ | Total Sum of Amount | | Line ▼ | ▽ |
| ☑ | Avg Amt | | Line ▼ | ▽ |
| ☐ | Prev Amt | | Line ▼ | ▽ |

504

Select a single item for chart category (X-Axis):

| | Name | Description | |
|---|---|---|---|
| ⦿ | store_dimension | | 🖉 |

Select a default level for your category column: [ store_country ▼ ]

506

Select default filters: (Optional)

[ Dimension Filters ] — 510

Applied Filters:

GENERATING DATA QUERIES USING A GRAPHICAL SELECTION TREE

RELATED APPLICATION

This application claims the benefit of U.S. Provisional Application No. 61/019,779, entitled "GENERATING DATA QUERIES USING A GRAPHICAL SELECTION TREE" and filed on Jan. 8, 2008, the entire content of which is incorporated herein by reference.

TECHNICAL FIELD

This disclosure relates to data selection and retrieval in an enterprise computer system.

BACKGROUND

Enterprise software systems are typically sophisticated, large-scale systems that support many (e.g., hundreds or thousands) of concurrent users. Examples of enterprise software systems include enterprise performance management systems, financial planning systems, budget planning systems, order management systems, inventory management systems, sales force management systems, business intelligence tools, enterprise reporting tools, project and resource management systems, and other enterprise software systems.

Many enterprise applications, such as performance management and business planning applications, may require a large number of users to enter data that the applications then accumulate and provide to higher-level areas of responsibility in an organization. Once data has been entered, one or more selected portions of the data typically must be retrieved and/or displayed to be utilized. The enterprise system may perform calculations on the selected data, or combine data submitted by one user with data submitted by another. Using the selected data, the system may generate reports for review by higher-level management. Often, an enterprise system may even make use of multi-dimensional data sources that organize and manipulate tremendous volumes of data in a plurality of data dimensions. Select portions of the information contained in a multi-dimensional data source may also be accessed or displayed.

SUMMARY

The disclosure relates to data retrieval in an enterprise system through use of a graphical selection tree. This tree, when visible, allows a user to select specific components of data dimensions that the user would like to view. Current and pre-existing selections may be displayed within the tree, and these selections may be changed at any time by the user. While navigating through the tree, displayable and selectable data can be loaded and displayed on demand. Once a user has made selections within the tree, one or more data queries are sent to a data storage system to retrieve response data corresponding to the queries. A user may thereby use the navigable selection tree to retrieve a select, filtered portion of data from an external storage system, which may then be used to update one or more real-time data views within a display, such as within a graphical dashboard.

In one embodiment, a method includes receiving by a computing device, within a graphical user interface (GUI), user input to select a predefined data metric, displaying, within the GUI, a selection tree containing a plurality of graphical branches associated with a data dimension (each branch corresponding to a data attribute within the data dimension), and receiving, within the GUI, user input to navigate through and select one or more of the branches in the selection tree. For each branch that is selected, the method further includes generating by the computing device a data query to request, from a data storage system, data of the selected data metric that matches the data attribute corresponding to the selected branch, and sending each generated data query to the data storage system.

In one embodiment, a device includes one or more processors, a data selection component, and a query engine. The data selection component, when executed by the one or more processors, receives, within a graphical user interface (GUI), user input to select a predefined data metric, displays, within the GUI, a selection tree containing graphical branches associated with a data dimension (wherein each branch corresponding to a data attribute within the data dimension), and receives, within the GUI, user input to navigate through and select one or more of the branches in the selection tree. The query engine is executable by the one or more processors to generate, for each branch that is selected, a data query to request data of the selected data metric that matches the data attribute corresponding to the selected branch, and sends each generated data query to a data storage system.

In one embodiment, a computer program product comprises a computer-readable medium has instructions embodied therein that, when executed, cause one or more processors to receive, within a graphical user interface (GUI), user input to select a predefined data metric, display, within the GUI, a selection tree containing a plurality of graphical branches associated with a data dimension, each branch corresponding to a data attribute within the data dimension, and, for each branch in the selection tree that is selected, generate a data query to request, from a data storage system, data of the selected data metric that matches the data attribute corresponding to the selected branch.

In one embodiment, a device comprises means for receiving input to select a predefined data metric, means for displaying a selection tree containing a plurality of graphical branches associated with a data dimension, each branch corresponding to a data attribute within the data dimension, and, for each branch in the selection tree that is selected, means for generating a data query to request data of the selected data metric that matches the data attribute corresponding to the selected branch.

The details of one or more embodiments of the invention are set forth in the accompanying drawings and the description below. Other features, objects, and advantages will be apparent from the description and drawings, and from the claims.

BRIEF DESCRIPTION OF DRAWINGS

FIG. 5 is a screen diagram illustrating a window within a graphical user interface (GUI) that displays various selectable data metrics, according to one embodiment.

DETAILED DESCRIPTION

Figure 1:
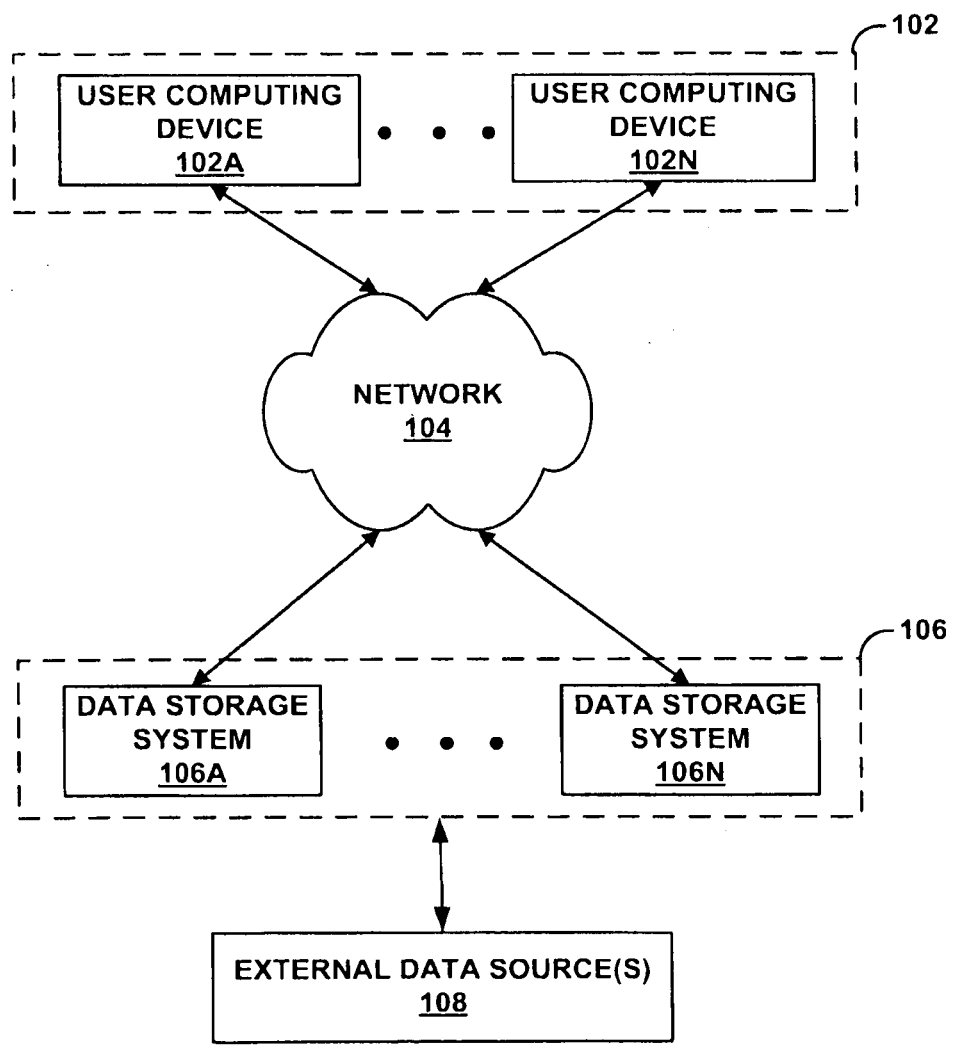
FIG. 1 is a block diagram illustrating an enterprise system that is capable of generating data queries to retrieve information from a data storage system, according to one embodiment.

FIG. 1 is a block diagram illustrating an enterprise system 100 that is capable of generating data queries to retrieve information from a data storage system (such as data storage system 106A), according to one embodiment. In this embodiment, a user of a user device (such as user device 102A) may interact with a graphical user interface (GUI) to select one or more branches within a navigable selection tree to generate such data queries and apply filters to cause information, such as predefined data metrics, to be retrieved and displayed within the GUI, as will be described on more detail below.

Within enterprise system 100, user computing devices 102A-102N (collectively, 102) interact with data storage systems 106A-106N (collectively, 106) via network 104. In one embodiment, a continuous stream of data and/or data changes may be provided from data storage systems 106 to user devices 102. Enterprise system 100 is capable of processing heterogeneous data from multiple different sources. Thus, as a result, data storage systems 106 are coupled to one or more external data sources 108. External data sources 108 may include transactional and non-transactional systems and data, and data from external data sources 108 may be generated, or provided, by external business applications, databases, message servers, text files, or other sources. Data storage systems 106 receive or retrieve data from external data sources 108 as event data that can be asynchronously or synchronously processed. Data storage systems 106 may include various agents to process incoming event data, and these agents handle the specific interfaces or processing mechanisms for the type of external data provided by a particular external data source. These agents are based on industry standard technologies, according to one embodiment. The use of these agents within data storage systems 106 allows data from multiple data sources to be virtualized as streams of real-time data that may be processed and transmitted, in some form, to the user devices 102 for further processing or display. For example, a large global enterprise that has silos of data in heterogeneous applications (which may be included within external data sources 108) can create a single hierarchical view of the data. This single view of the enterprise can, in one embodiment, be accessed via a graphical dashboard that contains the aggregated data across these heterogeneous systems from a single metric. This dashboard may be displayed on one or more of the user devices 102.

Thus, in one embodiment, user devices 102 provide graphical dashboards, or views, to users that show current activity with respect to the enterprise data stored within data storage systems 106. The views graphically illustrate the enterprise data and real-time changes to the data, according to one embodiment. Users may request particular views, such as aggregate sales data by location (e.g., country, state), from user devices 102. User devices 102 may create the views in response to requests from users by defining queries that are sent to data storage systems 106.

For exemplary purposes, user devices 102 and data storage systems 106 are described as associated with large-scale enterprise business intelligence systems, enterprise financial or performance management systems. The implementations described herein may be readily applied to user devices 102 and data storage systems 106 associated with other software systems, including other large-scale enterprise software systems. Examples of enterprise software systems include order management systems, inventory management systems, sales force management systems, business intelligent tools, enterprise reporting tools, project and resource management systems and other enterprise software systems. The implementations described herein may also be applied to smaller-scale business intelligence software and software systems.

User devices 102 may provide users access to streaming data to view events in real time, according to one embodiment. User devices 102 may retrieve such data from data storage systems 106. For example, user devices 102 may retrieve a real-time stream of data, such as sales by region or sales by product and country. Other examples of possible information may include early-warning indicators of problems with specific products or services, performance indicators, and risk indicators. Moreover, such data can be streamed to users in real time. That is, after a transaction event, such as a sale, occurs and is processed by one or more data storage systems 106 from one or more external data sources 108, the data may be updated within data storage systems 106, and user devices 102 may retrieve the updated data to update, in real time, the views provided to users. The data, in one embodiment, may be multi-dimensional, in that each multi-dimensional data element is defined by a plurality of different object types, where each object is associated with a different dimension. In addition, users may manipulate the data retrieved by user devices 102 via a graphical user interface (GUI) in order to retrieve additional details about the data.

In one embodiment, a user device, such as user device 102A, is capable of receiving, within a GUI, user input to select a predefined data metric. For example, a user may select a predefined metric related to average sales of a product. The user device 102A may then display, within the GUI, a navigable selection tree containing a plurality of graphical branches associated with a data dimension, each branch corresponding to a data attribute within the data dimension. For example, if the data dimension relates to retail stores that may sell the product, each branch in the tree may correspond to a attribute within that dimension, such as a specific location of the store (e.g., country, city, state). In the tree, a parent branch may correspond to a store location by country (e.g., Mexico), and sub-branches of the parent branch may correspond to state locations within that country (e.g., Guerrero, Yucatan). Sub-branches of the state branches may correspond to individual cities within that state.

After user device 102A displays the selection tree, user device 102A may receive, within the GUI, user input to navigate through and select one or more of the branches in the selection tree. For example, continuing from the scenario above, where the data dimension corresponds to stores, the user may select one or more branches in the tree for specific store country locations, and may further select one or more sub-branches under each country branch to select one or more state and/or city locations within the respective countries. In this fashion, the user is able to select the specific store locations for which retail sales data (i.e., the predefined data metric) is desired. For each branch that is selected within the tree, user device 102A is capable of generating a data query to request, from a data storage system (such as data storage system 106A), data of the selected data metric (e.g., sales data) that matches the data attribute corresponding to the selected branch (e.g., store country location, store state location, store city location). User device 102A then sends each generated data query to data storage system 106A. In one embodiment, user device 102A may encapsulate all such generated data queries within one batch command that is sent to data storage system 106A. The one batch command may comprise a batch query. User device 102A, in some instances, may send multiple batch queries to data storage system 106A at different, or defined, points in time. Each such batch query may encapsulate multiple data queries that have been generated by user device 102A.

Upon receipt of the queries, data storage system 106A retrieves the requested data and sends it back to user device 102A. User device 102A is then capable of displaying the response data back to the user. The response data may be displayed within a graphical dashboard, as described above, to update one or more of the real-time data views. By utilizing such a selection tree, the user is capable of specifying and creating one or more filters that are to be applied to the information represented by the data metric, such that the desired (filtered) data can be retrieved and displayed to the user in real-time. The GUI within the user device 102A used to display the selection tree may comprise the same GUI that is used to display response data, although multiple different graphical windows may be used for the selection and display operations. Graphical dashboards are typically displayed in separate windows, wherein incoming real-time data is used to update the views of the dashboard.

Figure 2A:
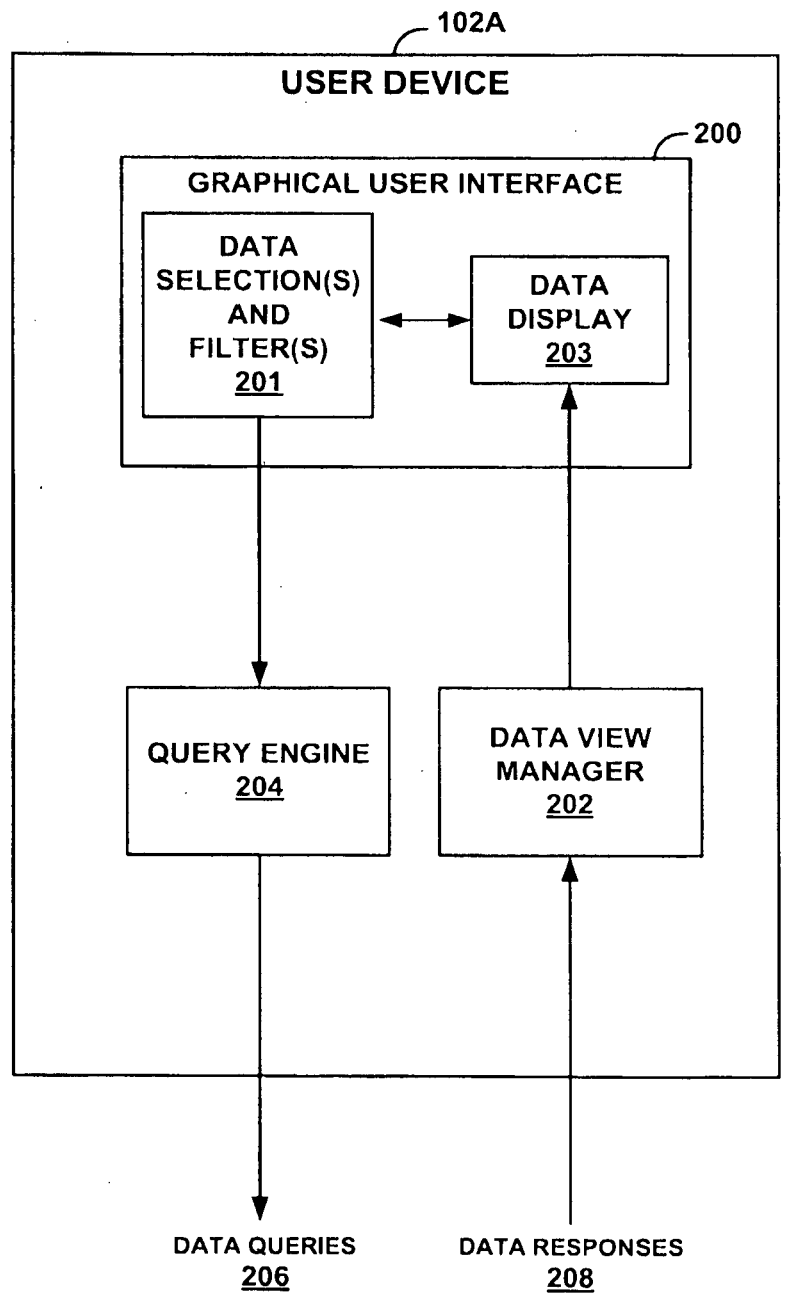
FIG. 2A is a block diagram illustrating additional details of the user device shown in FIG. 1, according to one embodiment.

FIG. 2A is a block diagram illustrating additional details of user device 102A shown in FIG. 1, according to one embodiment. In this embodiment, user device 102A includes graphical user interface (GUI) 200, data view manager 202, and query engine 204. GUI 200 is used to both receive selection input from a user (to generate data queries and apply data filters) and also to display output, or response, data. Thus, GUI 200 includes data selection and filter component 201 and data display component 203. Data selection and filter component 201 manages user input for selecting data and for applying filters. Component 201 manages the display of the navigable selection tree described above. The user may interact with the selection tree to select one or more graphical branches within the tree. Component 201 also manages user input for selecting one or more of the predefined data metrics within system 100, such as sales metrics.

Component 201 of GUI 200 may receive user input to navigate through and select one or more of the branches in a selection tree. For each branch that is selected within the tree, user device 102A is capable of generating a data query to request, from a data storage system (such as data storage system 106A), data of the selected data metric that matches the data attribute corresponding to the selected branch. Data queries are generated by query engine 204 of user device 102A. Once the user has finished making selections, GUI 200 provides the selection information to query engine 204. Query engine 204 then handles the generation of each individual data query. These queries serve as data filters, according to one embodiment, where query engine 204 manages the creation of data queries that are used as filters when retrieving information for the selected data metrics. Data queries 206 are then sent by query engine 206 to a data storage system, such as data storage system 106A. In one embodiment, a group of data queries are included within a batch command that is sent by query engine 204.

Data responses 208 received from data storage system 106A, in response to data queries 206, are processed by data view manager 202. Data view manager 202 is responsible for organizing and formatting information provided within the received data responses 208. Data view manager 202 then provides such information to data display 203 of GUI 200 for display purposes. The user is able to view information provided within data display 203 that corresponds to the data selections previously made by the user.

In one embodiment, component 201 of GUI 200 is coupled to and communicates with data display 203. Although component 201 and data display 203 are contained within a common GUI 200, they may be displayed, or represented, in distinct graphical windows within GUI 200. When component 201 communicates with data display 203, a user is able to access the navigable selection tree within data display 203. That is, data display 203 may include a selection element (such as a button) that allows a user to display and interact with the selection tree. In this fashion, the user can dynamically update the information within data display 203 by making selections within the selection tree to cause query engine 204 to generate new data queries 206.

In addition, component 201 is capable of initiating queries by query engine 204 to obtain information needed to populate the navigable selection tree, according to one embodiment. In this embodiment, information for various branches of the tree (such as names of countries, states, or cities, for example) may be provided by one or more of the data storage systems 106. When a user interacts with the selection tree, such as by expanding one or more branches within the tree, component 201 may cause query engine 204 to send data queries 206 to a data storage system, such as system 106A, to retrieve information about the tree or branches within the tree. This information can include values to display within the tree for viewing by the user.

Figure 2B:
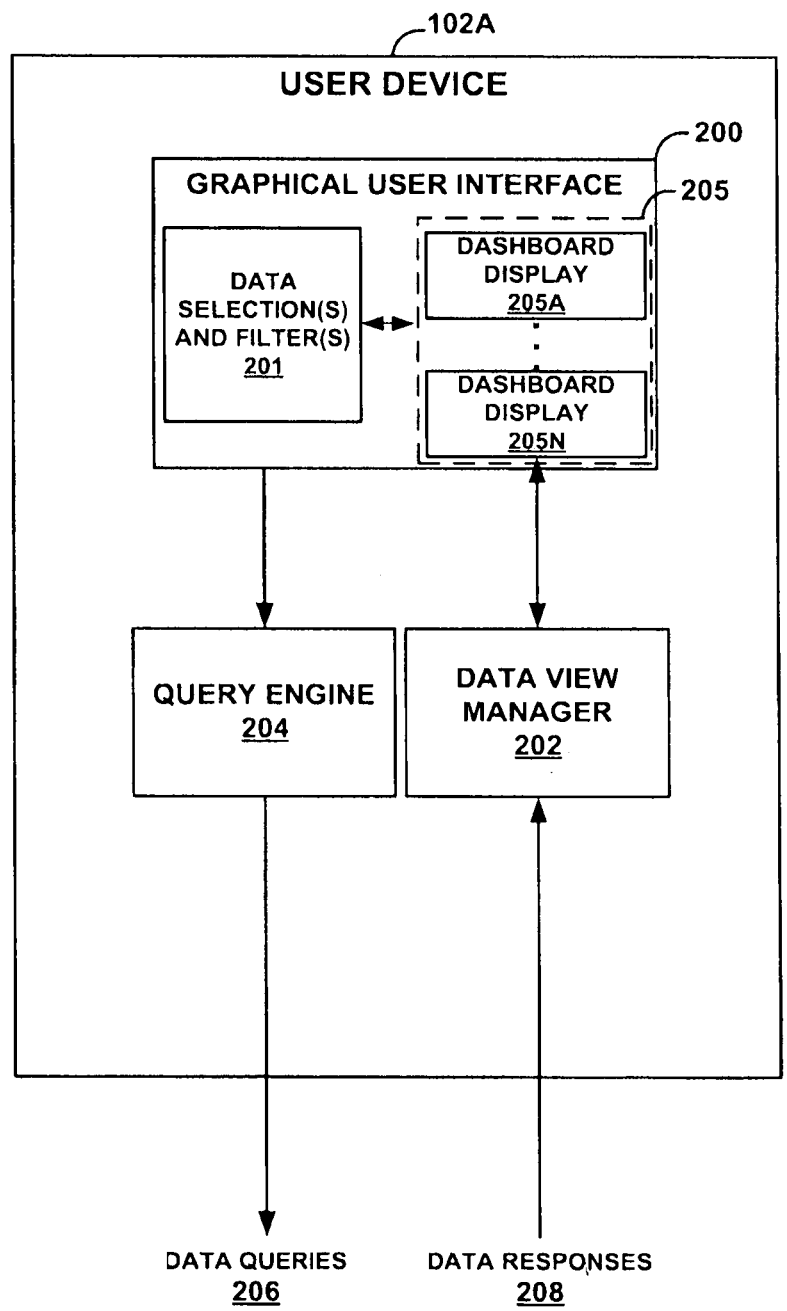
FIG. 2B is a block diagram illustrating another embodiment of the user device shown in FIG. 1.

FIG. 2B is a block diagram illustrating another embodiment of user device 102A shown in FIG. 1. FIG. 2B is substantially the same as FIG. 2A, except GUI 200 of FIG. 2B comprises one or more dashboard displays 205A-205N (collectively, 205). Dashboard displays 205 contain one or more real-time views of data that is displayed to a user. The displayed data may include real-time metric data that has been filtered according to one or more attributes specified in data queries 206 that have been sent by user device 102A. Views of the data may include chart views, bar graph views, raw data views, or other views that have been selected by the user. The dashboard displays 205 may be continuously updated over time to provide the user with a current snapshot as to the current state of the selected data. The user may also access component 201 via dashboard displays 205, such that the user may navigate through the selection tree and cause query engine 204 to send new data queries 206 for filtered data according to new selections made within the tree.

Figure 3:
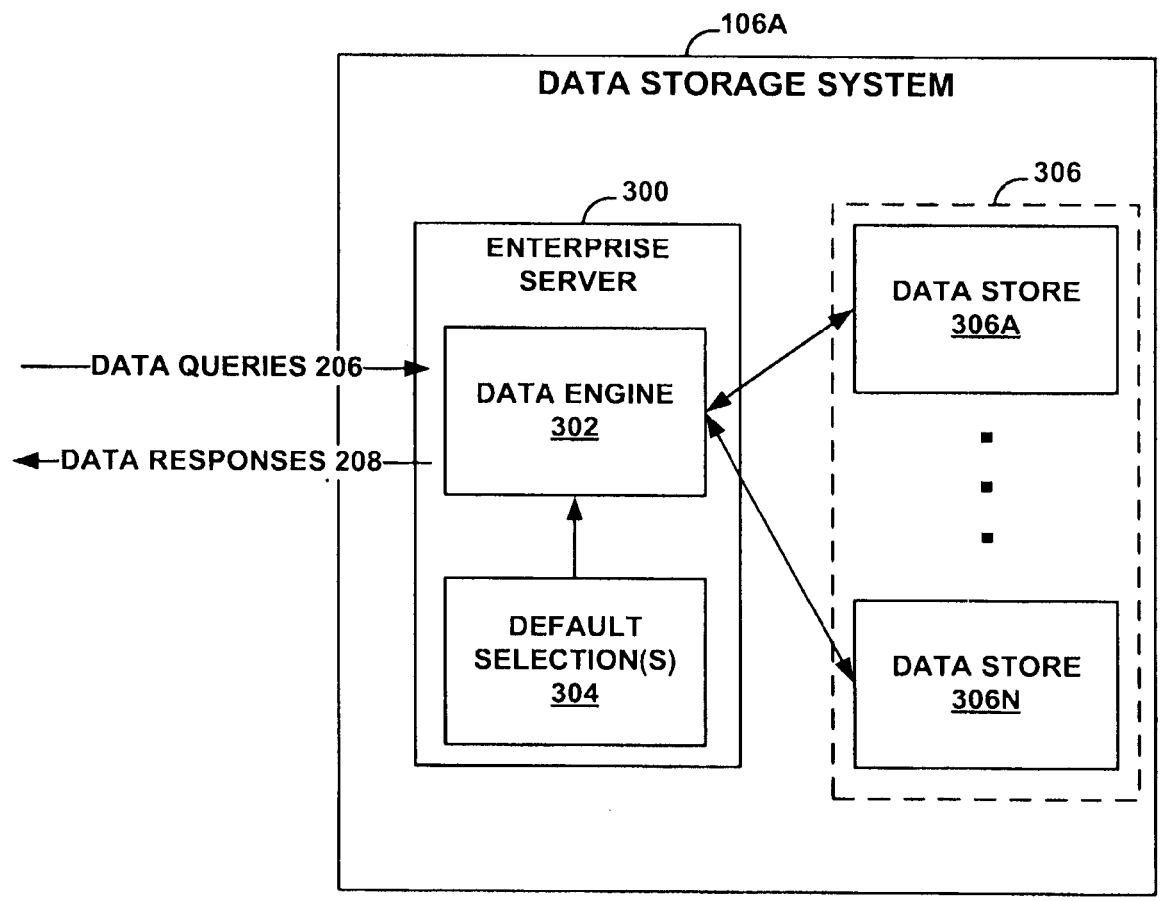
FIG. 3 is a block diagram illustrating further details of an individual data storage system shown in FIG. 1, according to one embodiment.

FIG. 3 is a block diagram illustrating further details of an individual data storage system 106A shown in FIG. 1. Data storage system 106A includes enterprise server 300 and one or more data stores 306A-306N (collectively, 306). Enterprise server 300 includes data engine 302 that receives data queries 206 from query engine 204 of a user device, such as user device 102A shown in FIGS. 2A-2B. Data engine 302 is also capable of transmitting data responses 208 to data view manager 202 of user device 102A.

When data engine 302 receives one of more of the data queries 206, it accesses one or more of the data stores 306 to retrieve data that matches the attributes set forth by the data queries 206. As described previously, query engine 204 generates data queries 206 according to user selections of predefined data metrics, and also user selections of one or more graphical branches within a selection tree for a specified data dimension. As such, when data engine 302 receives data queries 206, it retrieves metric data from one or more of the data stores 306 that matches the data attributes corresponding to the selected branches, wherein each individual data query may specify one such attribute for a selected branch. Query engine 204 may send data queries 206 to data engine 302 either individually or in a batch command. Once data engine 302 has retrieved the selected (filtered) metric data from one or more of the data stores 306, it sends such data back to data view manager 202 of the user device within one or more data responses 208.

Data stores 306 may include multiple types of metric data. This metric data may include both transactional and non-transactional data. Transaction data may include, for example, event data, and non-transactional data may include, for example, contextual (historical) data. Because data stores 306 are included within enterprise system 100 that processes heterogeneous data types, data stores can store multiple different types of data. This can include, for example, various forms of business data, such order management data, inventory management data, sales force management data, business intelligence data, enterprise reporting data, project and resource management data, or other enterprise data. In addition, data stores 306 may include multi-dimensional data storage areas.

In one embodiment, one or more of data stores 306 are streaming databases. These streaming databases store real-time streaming data that is received and processed from one or more of the external data sources 108 (FIG. 1). In one embodiment, the streaming databases are stored in memory rather than on a persistent computer-readable media. In one embodiment, the streaming databases are stored on persistent computer-readable media. In one embodiment, one or more of data stores 306 may comprise relational databases. In general, many different types of data in various different forms may be included within data stores 306.

As previously described, in some cases, user device 102A may request information from data storage system 106A as a user navigates through the graphical selection tree displayed within GUI 200 of user device 102A. For example, when a user expands a parent branch of the tree, query engine 204 of user device 102A may send a query to data storage system 106A requesting information about the sub-branches of the parent branch, such as displayable name values of these sub-branches. Data engine 302 is capable of receiving and processing such queries. Data engine 302 will retrieve the requested information from one or more of the data stores 306 and transmit the information back to user device 102A in one or more of the data responses 208.

As is shown in FIG. 3, data engine 302 may also obtain and utilize default selections 304 in certain scenarios. When a user interacts with the selection tree displayed within GUI 300 of user device 102A, or expands certain ones of the parent branches in the tree, query engine 204 may send one or more data queries 206 to data engine 302 requesting information about default selections within the tree. Default selections are those that are automatically selected within one or more branches in the tree without requiring initial user input. Of course, the user may change any of the default selections within the tree displayed within GUI 200 of user device 102A. When data engine 302 receives a request for default selections, it accesses default selection repository 304 and provides the requested information to user device 102 in one or more data responses 208.

In one embodiment, default selections 304 may also include generic default selections that have been stored or selected by the user. For example, if the user has made a general selection of "others" (see, e.g., FIG. 6) within a branch, default selections 304 may include such a default selection. Later, when data engine 302 obtains data from default selections 304 when initiating a query into data stores 306, data engine 302 will obtain such generic default selection information when created an expanded query. This process will be described in more detail below with reference to FIG. 6. In one embodiment (not shown), default selections 304 may comprise a repository that is stored within data stores 306.

Figure 4:
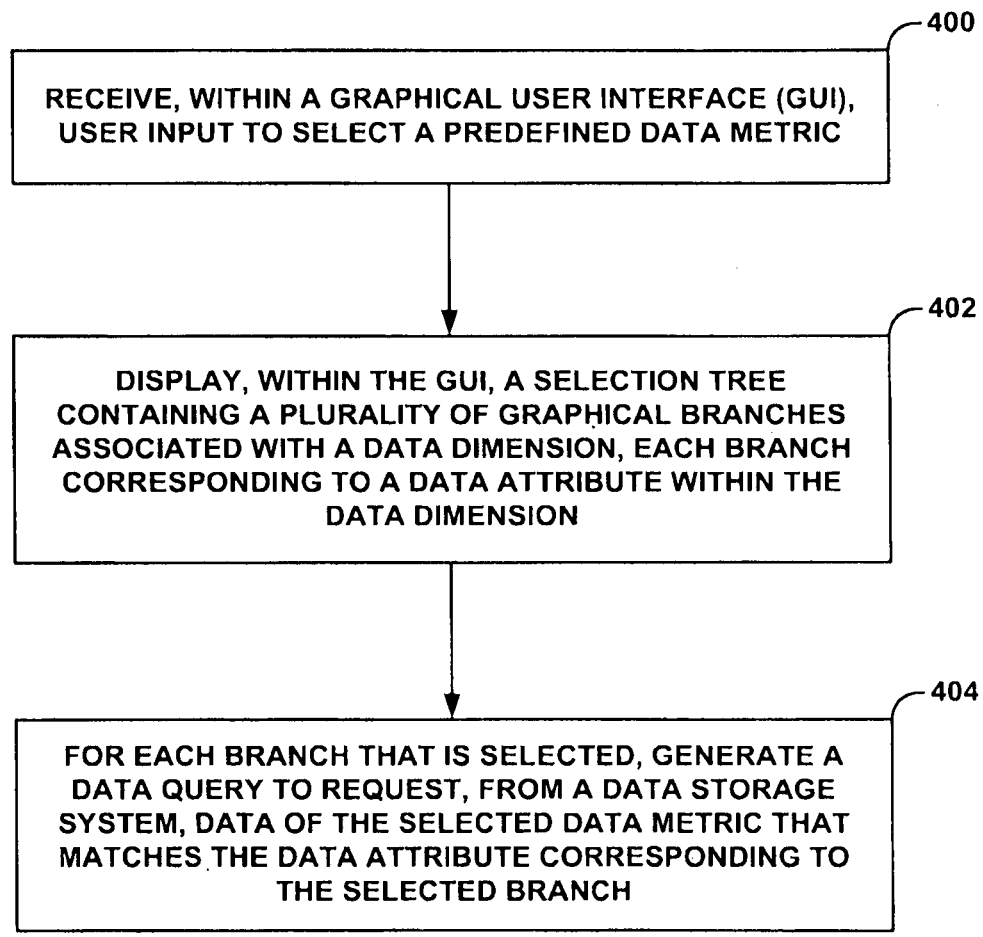
FIG. 4 is a flow diagram illustrating a method that may be performed by the user device shown in FIGS. 1, 2A and 2B, according to one embodiment.

FIG. 4 is a flow diagram illustrating a method that may be performed by user device 102A shown in FIGS. 1, 2A and 2B, according to one embodiment. In this embodiment, the method includes acts 400, 402, and 404.

In act 400, user device 102A receives, within a graphical user interface (GUI), user input to select a predefined data metric (such as, for example, a sales data metric). In act 402, user device 102A displays, within the GUI, a selection tree containing a plurality of graphic branches associated with a data dimension (such as, for example, a data dimension for a geographic location of a retail store). Each graphical branch in the selection tree corresponds to a data attribute within the data dimension. For example, each graphical branch may correspond to a particular location (e.g., country, state, city) of a particular store, if the data dimension relates to store location. User device 102A may also receive, within the GUI, user input to navigate through and select one or more of the branches in the selection tree.

In act 404, for each branch that is selected, user device 102A generates a data query to request, from a data storage system (such as data storage system 106A), data of the selected data metric that matches the data attribute corresponding to the selected branch. User device 102A may also send each generated data query (within data queries 206) to data storage system 106A. Upon receipt of data responses 208 from data storage system 106A, the user device 102A is capable of displaying the response data. The response data includes data of the selected metric that matches the data attributes corresponding to the selected branches.

FIG. 5 is a screen diagram illustrating a window 500 within a graphical user interface (GUI) that displays various selectable data metrics, according to one embodiment. The GUI may comprise GUI 200 shown in FIGS. 2A and 2B. The selectable data metrics may comprise predefined data metrics that may be retrieved and later displayed, in filtered form, to a user. The user may interact with the GUI to view information displayed within window 500, and to also provide input to and make selections within window 500.

Window 500 includes screen areas 502, 504, 506, and 508. Screen area 502 includes a number of selectable metrics that may be displayed in a chart. In one embodiment, the selectable metrics may be displayed on a first Y-axis of a chart. As is shown in FIG. 5, the metrics may be selected by placing check marks next to the listed metric. The exemplary metrics that are shown within screen area 502 are total sum amount, average amount, and previous amount, which each relate to sales amounts. Various other types of metric data may, however, been shown and selected. The metric data that is selected may be later displayed, in filtered form, to the user in a chart on one of the user devices 102, shown in FIG. 1, according to one embodiment. For example, the filtered data may be displayed on data display 203 shown in FIG. 2A or one of the dashboard displays 205 shown in FIG. 2B.

Screen area 504 includes additional selectable metrics that may, in one embodiment, be displayed on a second Y-axis of a chart. In the example of FIG. 5, similar data metrics are shown in screen area 504 for selection as are shown in screen area 502, but the invention would, of course, not be so limited. Any number of different types or forms of data metrics may be presented for selection. Within both screen areas 502 and 504 shown in FIG. 5, the user may also utilize drop-down menus to select the type of chart that is desired for the selected metrics (e.g., line, group). It is not required for a user to select any entries shown within screen area 504. If a user does not wish to utilize a second Y-axis within the chart, the user may de-select the checkbox labeled "Add a Second Y-Axis".

Screen area 506 includes one or more items that may be selected for display on an X-axis of a chart. In the example of FIG. 5, the user has selected "store_dimension" as the data dimension for display on the X-axis. The user may also select a default level for the indicated dimension. As shown in FIG. 5, the user has selected "store_country" as the default level.

In the example of FIG. 5, the user has selected a number of sales metrics to be displayed in conjunction with stores. Different sales metrics have been selected, and the user may wish to apply one or more data, or dimension, filters to be applied prior to displaying data. The amount of sales data for all stores may be quite large, and thus the user may strategically choose to apply one or more filters to view a desired sub-set of the overall sales data. Any applied filters that have been created or selected can be displayed within the screen area 508. The creation and/or selection of these filters is now described in more detail.

Figure 6:
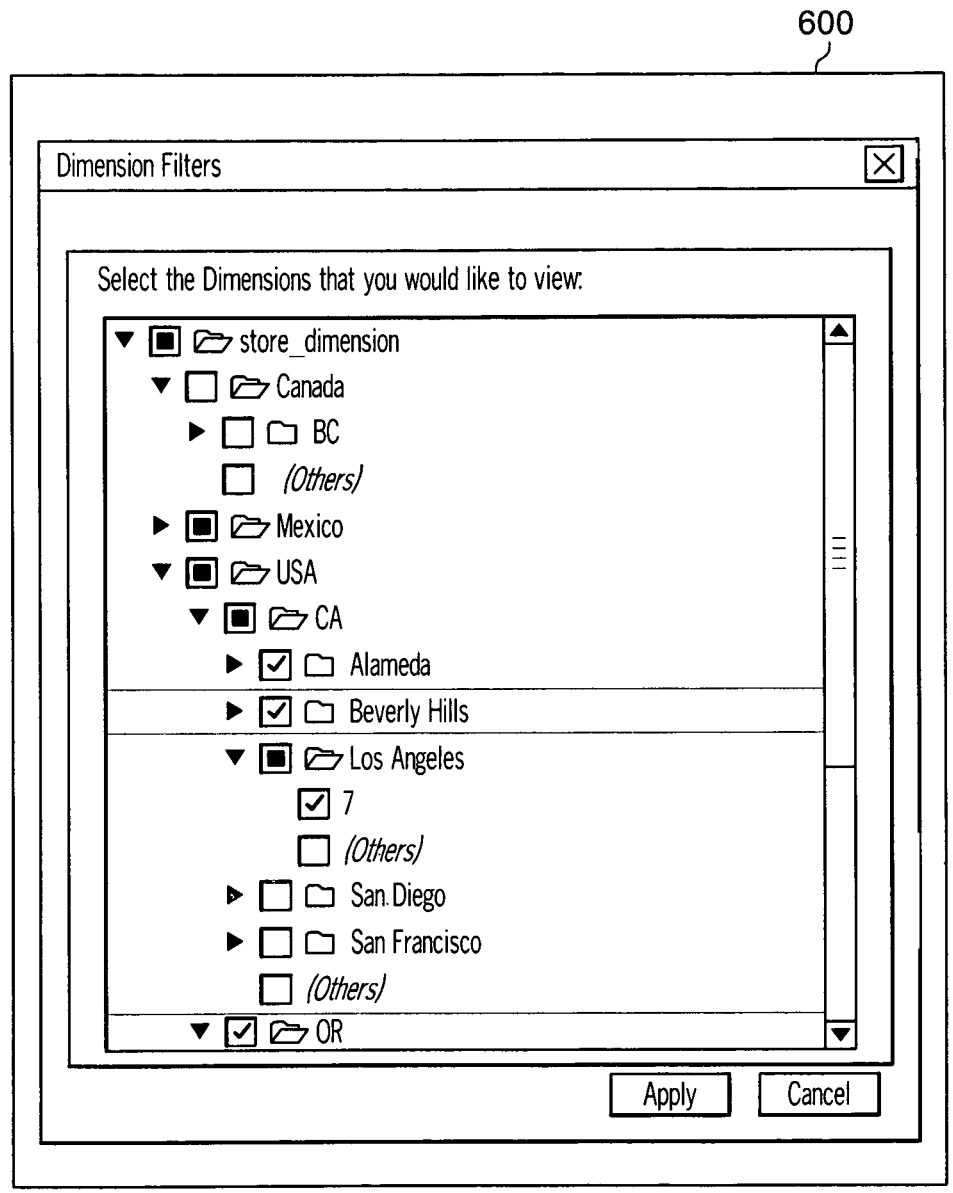
FIG. 6 is a screen diagram illustrating a window within a GUI that displays various selectable data, or dimension, filters, according to one embodiment.

FIG. 6 is a screen diagram illustrating a window 600 within a GUI that displays various selectable data, or dimension, filters, according to one embodiment. The GUI may comprise GUI 200 shown in FIGS. 2A and 2B. In one embodiment, the window 600 is displayed upon user selection of button 510 included within screen area 508 shown in FIG. 5. By interacting with window 600 displayed within the GUI, a user may select one or more filters for the dimension that was previously selected within screen area 506 of FIG. 5. These filters may then be applied, so that only a sub-set of the metric data is shown to the user, such as in a dashboard display.

FIG. 6 shows a selection tree within window 600. The selection tree contains a number of branches associated with a top-level data dimension, which is the dimension entitled "store_dimension" (associated with stores), in FIG. 6. This dimension corresponds to the dimension previously selected in screen area 506. Each branch within the tree corresponding to a data attribute within the data dimension. In one embodiment, the data attribute may be unique within the data dimension. Thus, in the example of FIG. 6, certain branches correspond to unique attributes for stores in specified countries (e.g., Canada, Mexico, U.S.A.). Other branches correspond to unique attributes for stores in specified states (e.g., California, Oregon) within a given country (e.g., U.S.A.). These branches are sub-branches within the given country parent branch. Still other branches correspond to unique attributes for stores in specified cities (e.g., Alameda, Beverly Hills) within a given state (e.g., California) within a given country (e.g., U.S.A.). These branches are sub-branches within the given state parent branch.

The user may provide user input to navigate through and select one or more of the branches in the selection tree displayed within window 600. In one embodiment, each branch (which may comprise either a parent branch or a sub-branch of a parent branch) is selectable. In the example of FIG. 6, a user may utilize checkboxes to select one or more of the displayed branches, although in other embodiments, other selection methods may be used (e.g., radio buttons).

Each branch included within the selection tree may include one or more sub-branches. If a branch has one or more sub-branches (i.e., if it is a parent branch), it can be graphically expanded or collapsed, visually, within the tree. Thus, in the example of FIG. 6, the parent branch "U.S.A." is a graphically expandable/collapsible branch, because it includes one or more sub-branches corresponding to states within the country "U.S.A.". The selection tree only shows sub-branches within a parent branch when the parent branch is in the expanded state. In the displayed window 600, a branch is in the expanded state when it includes downwardly pointed arrow next to the branch. A branch is in the collapsed state when it includes a right-pointed arrow next to the branch. In one embodiment, the user may simply select the arrow displayed next to the branch to toggle between the expanded and collapsed states. In some instances, a given branch within the selection tree may not include any children, and therefore may not include any sub-branches. In these instances, a branch having no sub-branches may not be graphically expanded or collapsed, visually, within the tree.

In one embodiment, when window 600 is displayed on one of the user devices 102 shown in FIG. 1, such as user device 102A, displayable values (such as names) of the sub-branches of a given parent branch are dynamically determined by retrieving such information from one or more of the data storage systems 106, such as data storage system 106A. (Hereinafter, user device 102A and data storage system 106A will be referred to for exemplary purposes only.) For example, when the parent branch named "USA" is in the collapsed state, the user may select the right-pointed arrow next to the branch to toggle the branch to the expanded state. At this point, the user device 102A may send a request to data storage systems 106A to retrieve the displayable values, such as names of the states, of sub-branches within the parent branch "USA". Upon receipt of these values, the user device 102 may display, within window 600, these values that correspond to the sub-branches. In one embodiment, when a user navigates to a parent branch and toggles it from a collapsed to expanded state for the first time within that instance of the tree, user device 102A sends a request to data storage systems 106A to retrieve displayable values for the sub-branches of the parent branch for display within window 600.

In one embodiment, user device 102A may further query data storage systems 106A for default selections, such as for default selections of the sub-branches of an expanded parent branch. These default selections may be maintained by component 304 of an individual data storage system, such as is shown in FIG. 3. The default selections are provided to user device 102A before the tree is shown or displayed, according to one embodiment. Upon receipt of the default selections, user device 102A may display the default selections as checkmarks within one or more of the checkboxes associated with branches shown in window 600. Default selections may correspond to typical selections made by certain users, under certain scenarios, or various other factors. In one embodiment, after the initial default selections are obtained from data storage systems 106A and displayed within the tree, subsequent calls (or queries) for sub-branch values can be compared to the default data to determine whether or not a value should appear as a selected default value.

In FIG. 6, checkmarks indicate which branches have been selected within the navigation tree. A separate graphic, indicated by a solid square, indicates that some, but not all, of the sub-branches for a given parent branch have been selected. Window 600 shows that some, but not all, of the sub-branches within the parent branch "Mexico" have been selected (even though Mexico is in the collapsed state, such that the sub-branches cannot be directly seen). This indicates that not all of the states corresponding to the sub-branches of "Mexico" have been selected.

Window 600 also shows that certain branches are named "Others". If a selection is made to the checkbox associated with a branch named "Others", a filter query will be generated to retrieve data for other sub-branches within a given parent branch, but will not retrieve data for sub-branches that are explicitly de-selected. A user selection of "Others" within a sub-branch of a parent branch may comprise a generic data attribute associated with the parent branch. When user device 102A later expands or selects the parent branch, data storage system 106A may provide an expanded list of selectable options, as displayable value information, for the sub-branches based upon any changes or new data within system 100. These sub-branches are specific instances of the generic data attribute associated with the selection of "(Others)".

To provide an example, FIG. 6 shows one branch of "CA" that displays a sub-branch named "(Others)". FIG. 6 shows an example where this sub-branch "(Others)" has not been selected (because it does not show a checkmark next to it.) However, if the user were instead to select this sub-branch named "(Others)," any later added cities within California that are added to the system may be displayed as selected sub-branches under "CA."

For example, if, at a later point in time, a new store within the city of "Hayward" may be added. This new store information may be stored within data stores 306 for the city of "Hayward," according to one embodiment. Assuming that the user has selected the "(Others)" sub-branch under "CA," but has not necessarily selected all sub-branches under "CA" (e.g., if the "San Diego" and/or "San Francisco" branches are not explicitly selected), any query (e.g., existing or default query) that is sent to data storage system 106A may retrieve the new store information for the city of "Hayward," and the sub-branch "Hayward" may then be automatically selected and displayed under the "CA" branch within window 600. In this fashion, a user is able to generically select a default value, such as "(Others)", to retrieve updated selection information within window 600 on a dynamic basis, without necessarily needing to make manual changes to the selection tree.

Once a user is satisfied with the one or more selections within the selection tree displayed in window 600, the user may select the "Apply" button. For each branch that is selected within the tree, the user device 102A will generate a data query, as an applied filter, to request, from data storage systems 106A, data for the one or more selected data metrics (FIG. 5) that matches the data attribute corresponding to the selected branch. The user device 102A then sends each generated data query to data storage system 106A. In one embodiment, each generated data query may be encapsulated within a batch query command that is sent to data storage system 106A that includes each of the applied filters. In one embodiment, in those cases in which branches or sub-branches may not have been expanded, the batch query command may include values from a previously existing, or default, query that is to be included within the batch query command. When a sub-branch has been selected within the tree, the data query that is generated matches the data attribute corresponding to the selected sub-branch (such as the name of a particular state) and further matches the data attribute corresponding to the parent branch (such as the name of a particular country).

Upon receipt of the data queries, data storage system 106A accesses its one or more data stores 306 (shown in FIG. 3), and provides data responses back to user device 102A for display. In one embodiment, user device 102A may display the response data to update its one or more dashboard displays, such as the one shown in FIG. 7. The response data corresponds to selected data metrics within window 500 of FIG. 5 that have been filtered according to the selections made in window 600 of FIG. 6.

Figure 7:
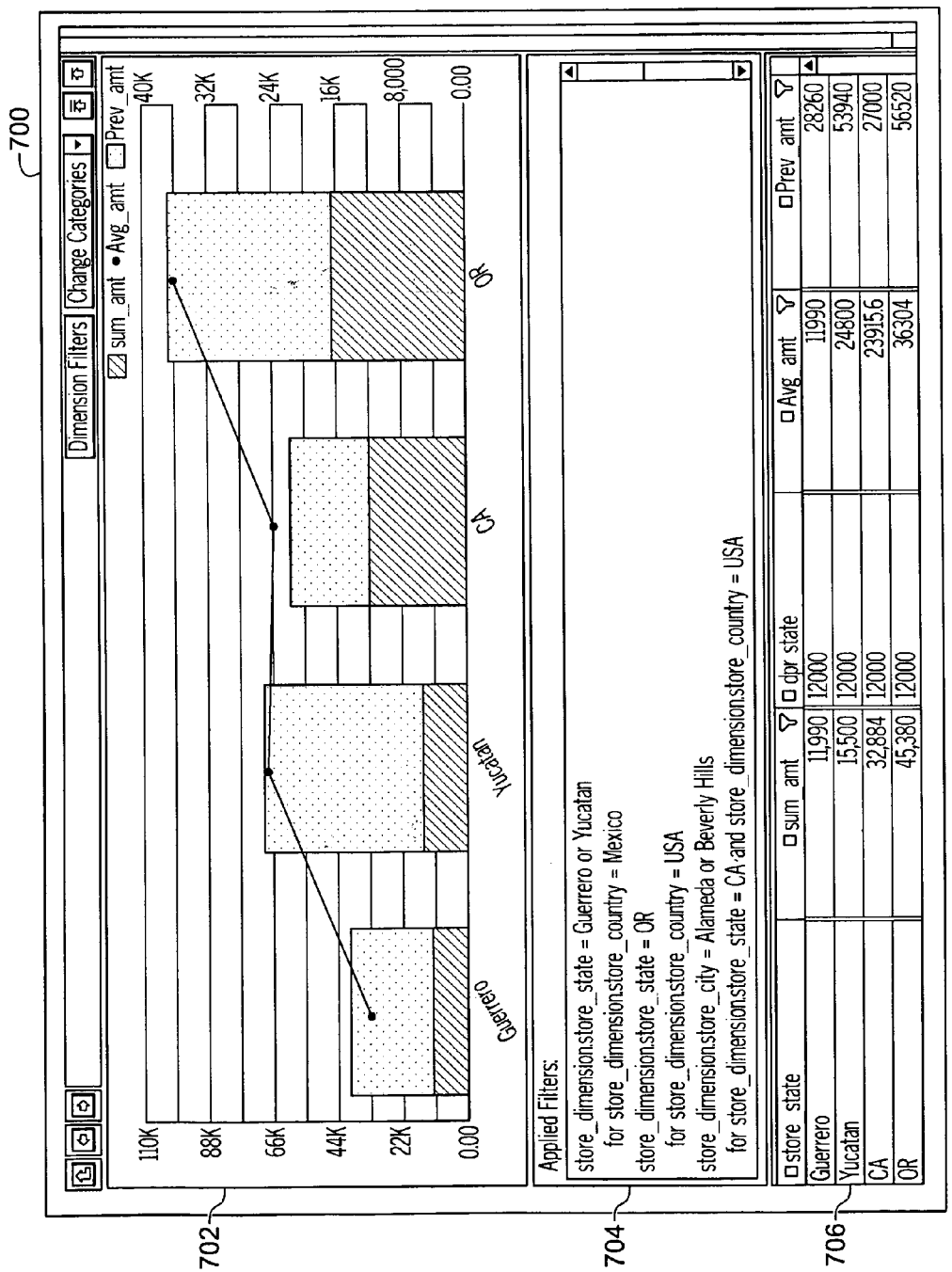
FIG. 7 is a screen diagram illustrating a window within a GUI that displays response data in a real-time dashboard display, according to one embodiment.

FIG. 7 is a screen diagram illustrating a window 700 within a GUI that displays response data in a real-time dashboard display, according to one embodiment. The GUI may comprise GUI 200 shown in FIGS. 2A and 2B. In one embodiment, window 700 may be displayed within one or more of the dashboard displays 205 shown in FIG. 2B.

The real-time data shown in window 700 corresponds to the selected data metrics selected in window 500 (FIG. 5) that have been filtered according to the selections made in window 600 (FIG. 6). For each branch that was selected in window 600, user device 102A displaying windows 500, 600, and 700 sends a data query, as an applied filter, to data storage system 106A and receives a corresponding data response that contains data of the one or more selected metrics that match the data attribute corresponding to the selected branch. If the selected branch is a sub-branch, the selected metrics match the data attributes corresponding to the one or more parent branches of the sub-branch, as well, according to one embodiment. The received data responses are used by user device 102A to update one or more data views window 700.

As is shown in the example of FIG. 7, window 700 includes screen areas 702, 704, and 706. Screen area 704 shows, in textual form, the set of filters that have been applied, which correspond to the data queries that have been sent by user device 102A to data storage system 106. As shown, each applied filter specifies, for the selected dimension (stores), a group of one or more states for a selected country, and a group of one or more cities for a selected state in a selected country. These filters correspond to the selections that were made in the selection tree shown in window 600. Screen area 704 includes a scroll bar to view all of the filters within the group of applied filters.

Screen area 706 displays a textual representation of the filtered metric data matching the attributes set forth by the applied filters. The selected data metrics correspond to the user selections made within window 500 (FIG. 5). The first column of information contained within screen area 706 corresponds to certain applied filters, such as store states. Thus, the metric data shown in the remaining columns of screen area 706 are filtered according to the filter specified in the first column (e.g., sales data only for the states of Guerrero, Yucatan, California, and Oregon). In one embodiment, the user may change the filter level, or category, indicated in the first column of screen area 706. For example, the user may change the filter level from state to country, in which case all applicable (filtered) countries will be shown.

Screen area 702 displays a graphical representation of the filtered metric data that matches the attributes set forth by the applied filters. Various charts, such as group and line charts, can be shown in screen area 702. In window 500 of FIG. 5, selections were made to display certain predefined sales metric data along first and second Y-axes, and to display both group and line chart values. In addition, a selection was made to display store dimension data along with X-axis. As such, screen area 702 displays such information, as filtered according to the applied filters, in a graphical format. Dimensional information relating to stores by state location are shown along the X-axis. However, as shown by the selections in window 600 (FIG. 6), various countries (branches) were also selected. The user may change the filter level, or category, in both screen areas 706 and 702 to view data at a different filter level (such as country, or even city). Textual representations of the filtered data are shown in screen area 706, and graphical representations of the filtered data are shown in screen area 702.

Figure 8A:
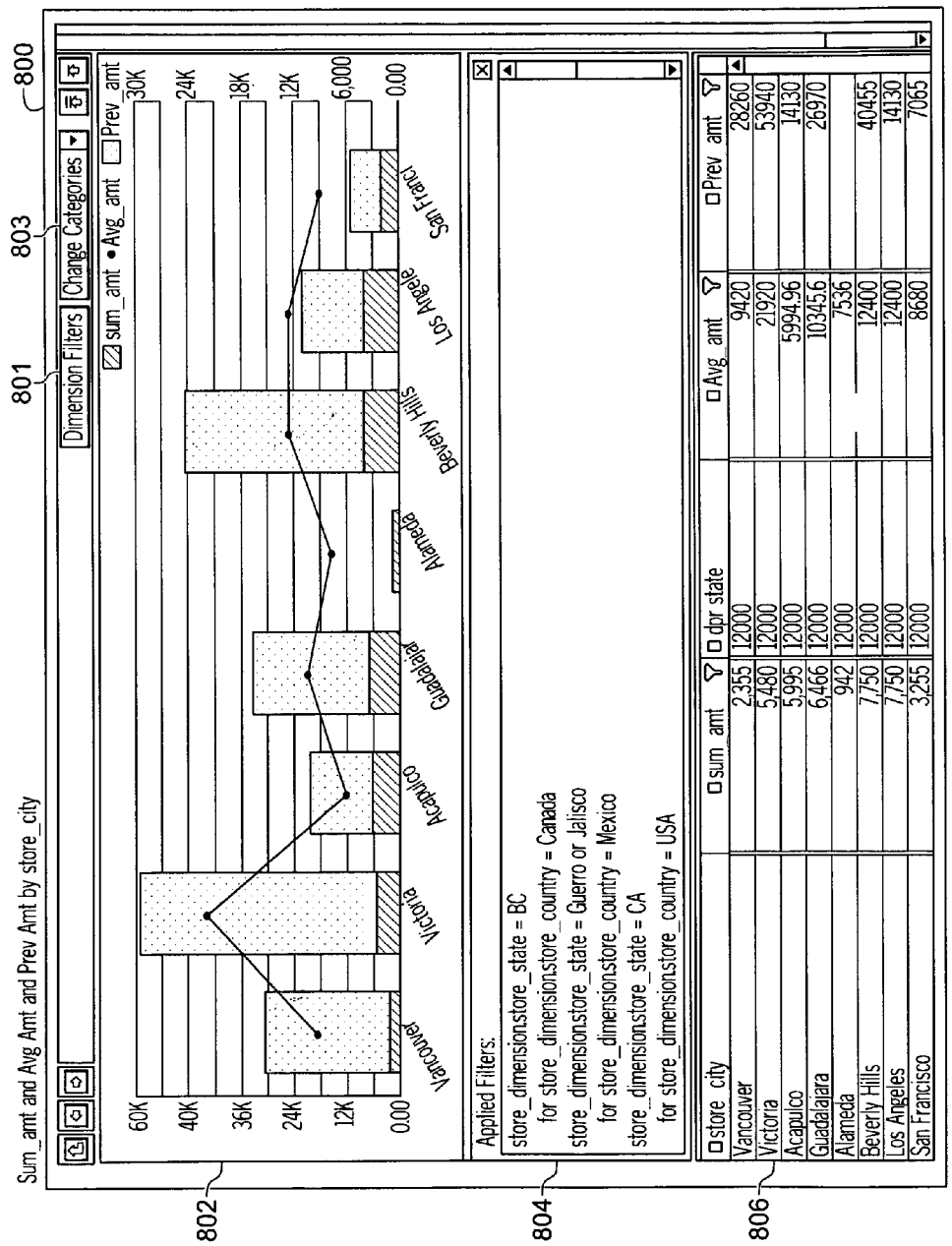
FIGS. 8A and 8B are screen diagrams illustrating windows within a GUI that display certain filtered metric information in a graphical dashboard, according to one embodiment.

FIG. 8A is a screen diagram illustrating a window 800 within a GUI that displays certain filtered metric information in a graphical dashboard, according to one embodiment. For example, window 800 may be includes within one of the dashboard displays 205 shown in FIG. 2B. The GUI may comprise GUI 200 shown in FIGS. 2A and 2B. Window 800 provides an example of a real-time view of data matching the attributes set forth by the applied filters. The filtered metric information shown in FIG. 8A is not necessarily based upon the same group of filters that were applied to produce the information shown in FIG. 6, although many of the individual filters may be substantially similar (or based off selections similar to those shown in window 600 of FIG. 6).

Window 800 includes screen area 802, 804, and 806. Screen area 804 shows a textual representation of the filters that have been applied. These filters were based upon selections made in a selection tree, similar to the one shown in FIG. 6. Individual data queries also were created and sent by the user device 102A to the data storage system 106A according to the applied filters. As shown, the filters once again relate to a selected data dimension of stores, and the filters may specify individual selected states within a country. Screen area 804 shows distinct and separate applied filters, such as filters for states within the countries of Canada, Mexico, and the U.S.A. Screen area 804 includes a scroll bar that is usable to scroll up or scroll down the group of filters that have been applied, which include additional filters for specific cities within a selected state of a selected country.

Screen area 806 includes a textual representation of certain filtered metric data, and screen area 802 includes a graphical representation of such filtered metric data. The displayed data corresponds to the selected metric data that matches one or more of the attributes specified by the applied filters. As shown in the example of FIG. 6, the filtered metric data relates to specific sales information for only certain cities in Canada, Mexico, and the U.S.A. The entries shown in the first column of data in screen area 806, and the entries shown along the X-axis in screen area 802, correspond to selected cities that are included within the applied filters. These filters are defined, in one embodiment, by the selections of a user within the navigable selection tree, such as the tree shown in FIG. 6. By selecting one or more branches within the tree, and defining such filters, the user is capable of seeing, within the window 800 of a dashboard display, filtered, real-time data that meets the attributes of the filter(s).

Figure 8B:
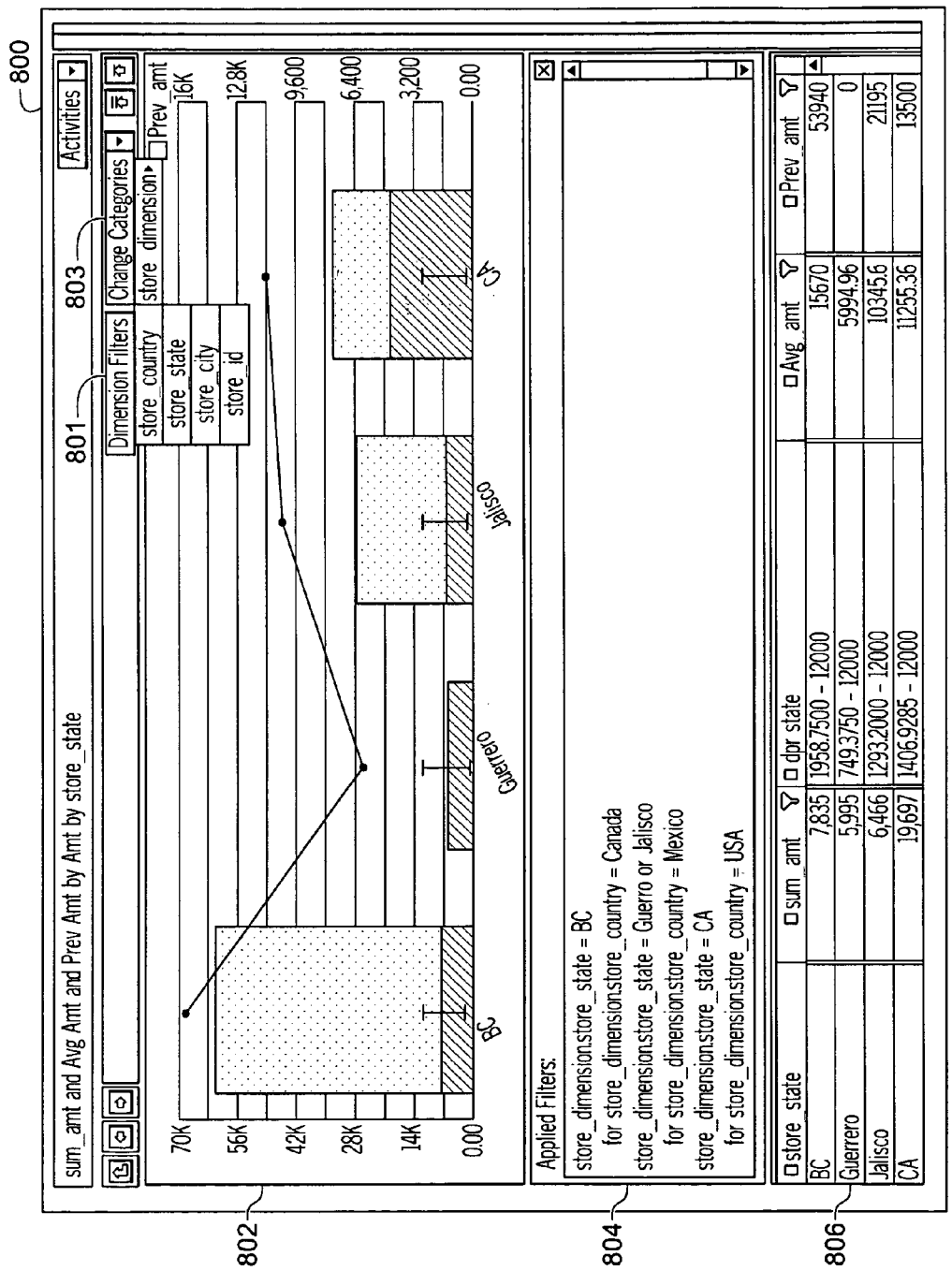

However, because the filters are multi-level (or have multiple categories), the user may wish to see textual and/or graphical representations of the filtered data at different filter levels, or categories. For example, the selection tree shown in FIG. 6 allows a user, within the data dimension for stores, to select store locations by country, state, or city. In FIG. 8A, the filtered metric data is shown according to individual cities that have been selected within specified countries. However, the user may wish to view filtered data at a different level, such as in the state or even country category. FIG. 8B shows an example of how a user may change the view within the dashboard.

In FIG. 8B, the user may change the level, or category, from which to view filtered metric data. By making such a change, a user may effectively select a view type within the graphical dashboard displayed in window 800. If, for example, the user wishes to change the category of the store data dimension from the state level to the country or city level, the user may select button 803 within window 800. All selectable levels for the store dimension are then displayed, such as in a drop-down menu or pick list. As is shown in FIG. 8B, the user may select any of the levels of country, state, city, or even specific store identifier (such as name or label). These levels pertain specifically to the higher-level data dimension, which is the store dimension in the present example, and also correspond to the types of branches that are shown and can be selected within the selection tree (such as the one shown in FIG. 6).

In FIG. 8B, it is assumed that the user has selected the level of state. Thus, once such a selection is made, the filtered information that shown in screen areas 802 and 806 changes to the state level. That is, the selected metric data is filtered according to the applied filters at the state level (rather than at the city level, as is shown in FIG. 8A). The filtered data shown within screen areas 802 and 806 are updated, such that values at the state level are shown in the first column of screen area 806 and across the X-axis in screen area 802. The data views within screen areas 802 and 806 for this new view type are updated with the filtered metric sales data that matches the attributes specified by the applied filters at the state level. The complete list of applied filters is also still shown within screen area 804.

Figure 9:
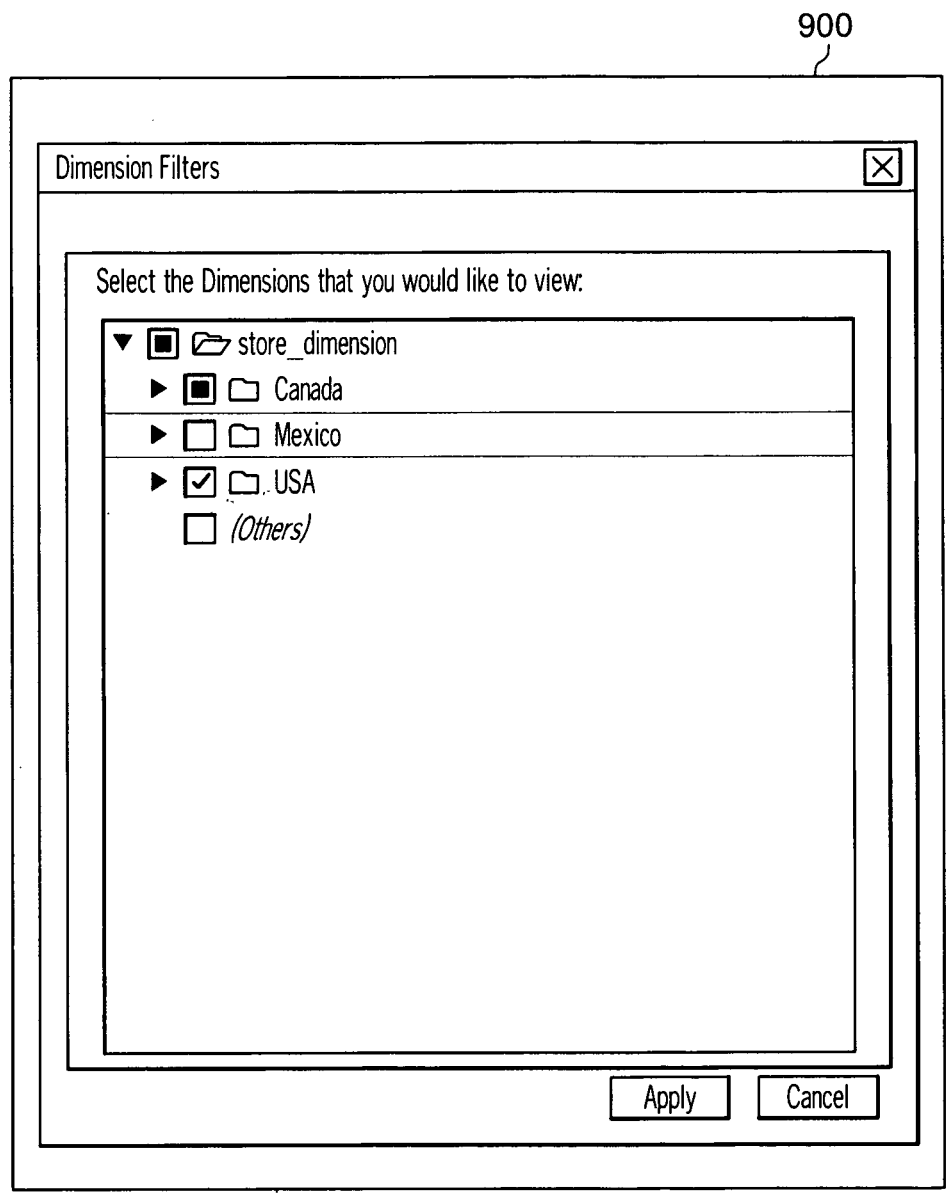
FIG. 9 is a screen diagram illustrating a window within a GUI that displays various selectable graphical branches within a selection tree, according to one embodiment.

FIG. 9 is a screen diagram illustrating a window 900 within a graphical user interface (GUI) that displays various selectable graphical branches within a selection tree, according to one embodiment. The window 900 may display branch levels (e.g., state, city) for any particular parent branch (e.g., country). The GUI may comprise GUI 200 shown in FIGS. 2A and 2B. In one embodiment, the user may view window 900 by selecting button 801 included within window 800, which displays the dashboard. This functionality allows a user to dynamically change one or more views within a dashboard in real-time. By selecting button 801 within dashboard window 800, the user can change one or more selections for the dimensional filter(s). FIG. 9 shows an exemplary window 900 that is displayed upon user selection of button 801.

Within window 900, the navigable selection tree is again displayed to the user. Previously selected branches are displayed within the tree. In the example of FIG. 9, exemplary branches for a tree are shown within one data dimension (store_dimension). By interacting with the tree shown in FIG. 9, the user can change one or more of the selections of branches (either parent branches or sub-branches) within the tree. Once the user has finished changing selections, the user may select the "Apply" button. At this point, the user device 102A sends updated data queries 206, via query engine 204, to one or more of the data storage systems 106. Upon receipt of data responses 208, data view manager 202 is capable of updating the display of the dashboard within GUI 200.

Figure 10:
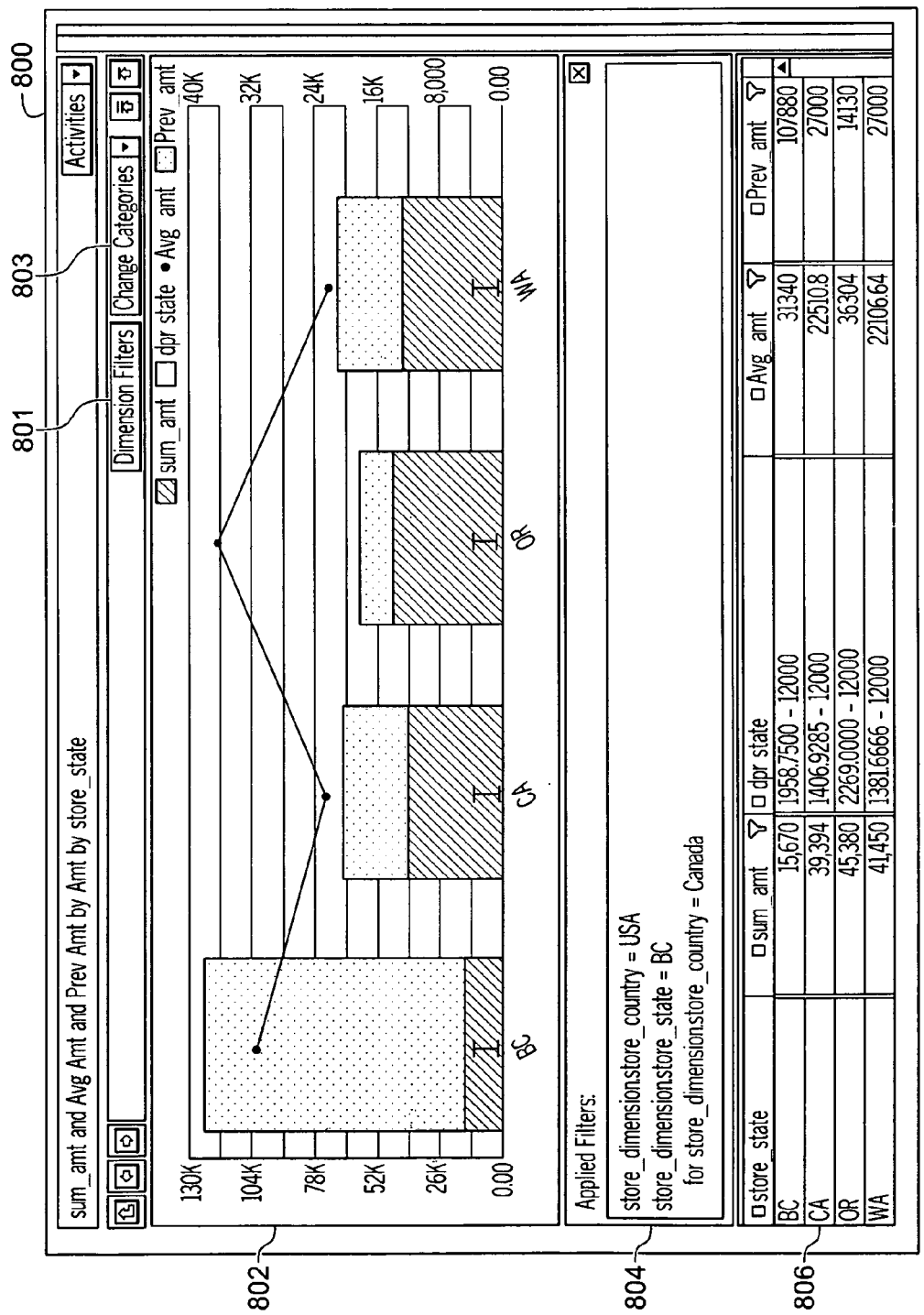
FIG. 10 is a screen diagram illustrating updated contents of the dashboard within a window, according to one embodiment.

FIG. 10 is a screen diagram illustrating updated contents of the dashboard within window 800 of the GUI, according to one embodiment. One or more of the views of the dashboard are updated. As shown in the example of FIG. 10, metric data within the store data dimension (at the state level) is shown that matches the attributes of the selections made within the tree shown in FIG. 9. The updated filters that are based upon these selections are shown in screen area 804. Textual representations of the updated response (filtered) data are shown in screen area 806, and graphical representations are shown in screen area 802. The user is therefore able to see one or more updated views of real-time data within the dashboard display according to the user's selections.

Figure 11:
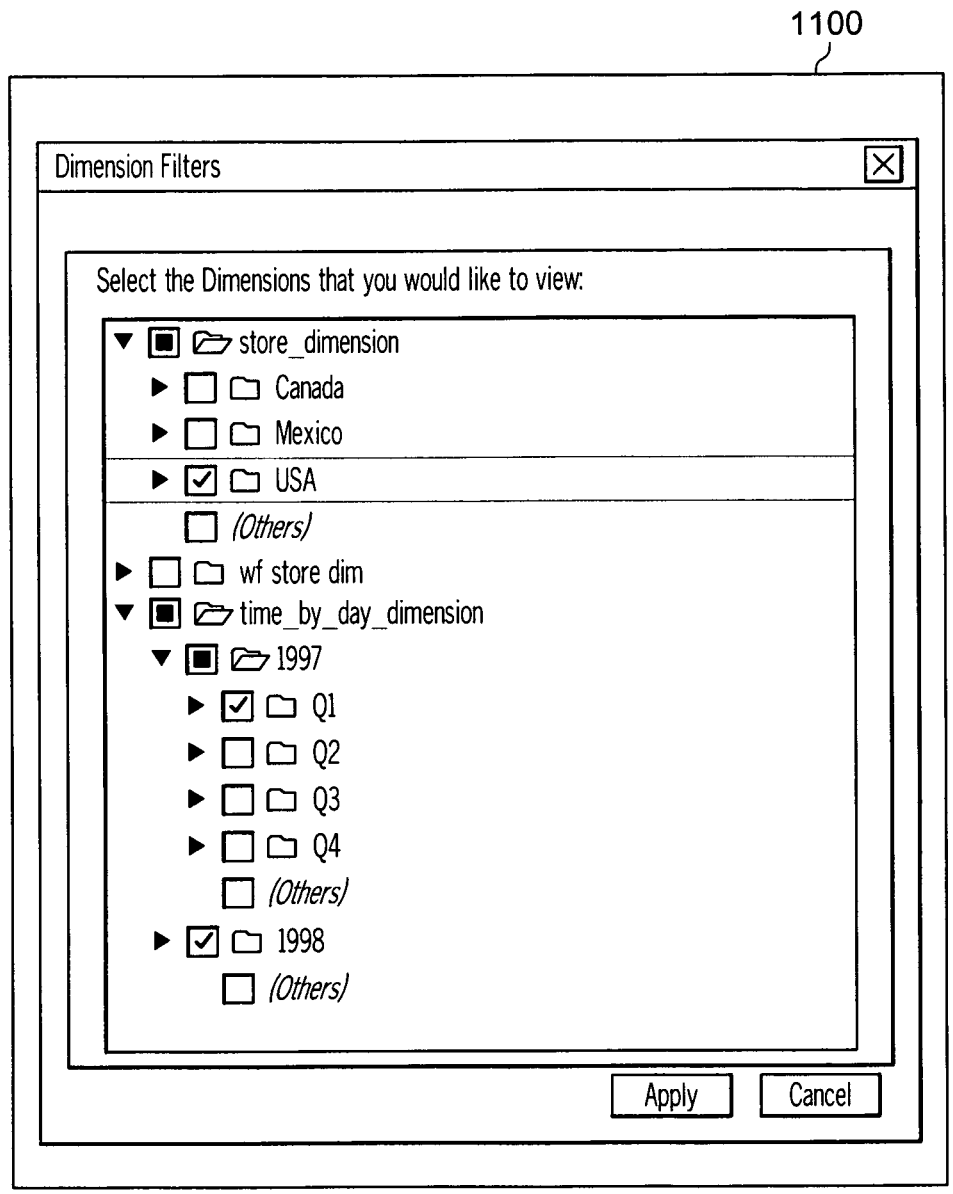
FIG. 11 is a screen diagram illustrating a window within GUI that displays an alternate embodiment of a navigable selection tree.

FIG. 11 is a screen diagram illustrating a window 1100 within a graphical user interface (GUI), such as GUI 200, that displays an alternate embodiment of a navigable selection tree. Similar to the embodiments of the previously described selection trees, the selection tree shown in FIG. 11 allows a user to select one or more branches (parent branches and sub-branches) within a specified data dimension. Previous examples showed the data dimension of "store_dimension" within the tree. This data dimension is also shown in FIG. 11. Thus, a user would be able to select multiple branches (such as country branches, state branches, city branches, and the like) for this dimension to generate applied filters. However, also shown in FIG. 11 are additional dimensions within the tree, each having a number of selectable branches, as well. One such dimension, named "wf store dimension", corresponds to the work forces associated with the various stores. The graphical branches associated with this particular dimension may correspond to various different levels, or categories, of employees, such as national managers, regional managers, local managers, retail salespeople, and the like. Another dimension shown within the selection tree is named "time_by_day_dimension". As shown in FIG. 11, branches associated with this dimension may correspond to individual years, quarters, months, days, and the like.

Using the selection tree shown in FIG. 11, a user may select multiple branches associated with multiple different data dimensions to more concisely define data filters for one or more selected data metrics. For example, if the user has selected certain sales metrics, the user may additional utilize the tree shown in FIG. 11 to filter down the sales metrics to sales by particular work force members in certain store locations during specified time periods. The selections cause user device 102A to send data queries to one or more of the data storage systems 106 to retrieve data responses for metric data that match the attributes specified by the selected branches in the selection tree associated with multiple data dimensions. Utilizing the tree shown in FIG. 11 provides the user with additional filtering capabilities to select the desired data for display, such as within a real-time dashboard display.

As will be appreciated by one skilled in the art, various aspects or features of the present invention may be embodied in hardware, software, firmware, or any combination thereof. Furthermore, certain embodiments may take the form of a computer program product embodied in any tangible medium of expression, such as a computer-readable medium, having computer usable program code or instructions embodied therein.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or other data storage medium. More specific examples (a non-exhaustive list) of the computer-readable medium may include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code or instructions for carrying out operations of various aspects of the present invention may be written in any combination of one or more programming languages, including an object oriented programming language such as Java, Smalltalk, C++ or the like, and/or conventional procedural programming languages, such as the "C" programming language or similar programming languages. The program code/instructions may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various aspects and techniques are described above with reference to one or more flowchart illustrations and/or block diagrams. It will be understood that each block of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, or other programmable data processing apparatus to produce a machine, such that the instructions, which are executed by the one or more processors of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational acts to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart illustration(s) and block diagram(s) in the Figures illustrate the architecture, functionality, and operation of possible implementations of systems, devices, methods or computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

Various embodiments of the invention have been described. These and other embodiments are within the scope of the following claims.

What is claimed is:

1. A method comprising:
receiving, by a computing device, a selection of a first sub-branch of a parent branch of a graphical selection tree, wherein:
the parent branch of the graphical selection tree is associated with a data dimension,
the first sub-branch is associated with a generic data attribute associated with the parent branch of the graphical selection tree,
a second sub-branch is added as a sub-branch of the parent branch of the graphical selection tree after the selection of the first sub-branch, and
the second sub-branch is a specific instance of the generic data attribute associated with the parent branch of the graphical selection tree;
responsive to the selection of the first sub-branch of the parent branch of the graphical selection tree, automatically selecting, by the computing device and without receiving user input to select the second sub-branch of the parent branch of the graphical selection tree, the second sub-branch of the parent branch of the graphical selection tree; and
generating, by the computing device, a query to request, from a data storage system, data for each selected data metric that matches the specific instance of the generic data attribute corresponding to one of a plurality of selected sub-branches, wherein the plurality of selected sub-branches includes the automatically selected second sub-branch.

2. The method of claim 1, further comprising:
receiving user input to navigate through and select one or more of the branches in the graphical selection tree; and
sending the generated query to the data storage system.

3. The method of claim 1, wherein generating the query to request data for each selected data metric that matches the specific instance of the generic data attribute corresponding to one of the plurality of selected sub-branches further comprises generating, for the selected sub-branch, the query that matches the specific instance of the generic data attribute corresponding to the selected sub-branch and that further matches the data attribute corresponding to the parent branch.

4. The method of claim 1, further comprising sending the generated query to the data storage system within a batch query command.

5. The method of claim 1, further comprising sending the generated query to an enterprise server of the data storage system.

6. The method of claim 1, further comprising:
receiving user input to select a view type for one or more data views in a graphical dashboard window, the view type being associated with types of branches that are included within the graphical selection tree; and
displaying the one or more data views within the graphical dashboard window of the selected view type.

7. The method of claim 1, further comprising receiving user input to navigate through and select one or more of the branches in the graphical selection tree by checking one or more checkboxes, each checkbox being associated with a branch in the graphical selection tree.

8. The method of claim 1, wherein the parent branch comprises a graphically expandable/collapsible branch within the graphical selection tree, the method further comprising receiving user input to navigate through and select one or more sub-branches of the parent branch in the graphical selection tree by navigating through the graphically expandable/collapsible parent branch within the graphical selection tree.

9. The method of claim 8, further comprising:
upon receipt of user input to navigate through the graphically expandable/collapsible parent branch within the graphical selection tree, sending to the data storage system a request for displayable values of one or more sub-branches of the navigated parent branch;
receiving, from the data storage system, the displayable values corresponding to the request; and
displaying the displayable values received from the data storage system of the one or more sub-branches of the navigated parent branch.

10. The method of claim 1, wherein the first sub-branch of the parent branch of the graphical selection tree comprises a sub-branch named "others".

11. The method of claim 1, wherein generating the query to request, from the data storage system, data for each selected data metric that matches the specific instance of the generic data attribute corresponding to one of the plurality of selected sub-branches comprises generating the query to request, from the data storage system, data of a first selected data metric and a second selected second data metric that matches the specific instance of the generic data attribute corresponding to the selected sub-branch.

12. The method of claim 1, wherein the data dimension comprises a first data dimension, the method further comprising:

displaying a plurality of branches in the graphical selection tree associated with a second data dimension, each branch corresponding to a data attribute within the second data dimension;

receiving user input to navigate through and select one or more of the branches in the graphical selection tree associated with the second data dimension;

for each branch associated with the second data dimension that is selected, generating a query to request, from the data storage system, data for each selected data metric that matches the data attribute corresponding to the selected branch; and sending each generated data query to the data storage system.

13. The method of claim 1, further comprising:

displaying the graphical selection tree within a graphical user interface (GUI);

for each branch in the graphical selection tree that is selected, receiving a data response from the data storage system containing data of the selected metric that matches the specific instance of the generic data attribute corresponding to the selected branch, wherein the data response includes data of the selected metric that matches the specific instance of the generic data attribute corresponding to the automatically selected second sub-branch; and updating the GUI to include the data of the selected metric that matches the specific instance of the generic data attribute corresponding to the selected branch.

14. The method of claim 13, further comprising:

displaying each data response in a graphical dashboard window to update one or more real-time data views within the graphical dashboard window that is continuously updated over time to provide a current snapshot of a current state of the data of the selected data metric;

responsive to a change in the current state of the data of the selected data metric, receiving on the computing device a stream of data that includes the current state of the data of the selected data metric; and updating the graphical dashboard window to provide the received current state of the data of the selected data metric.

15. A computer-readable memory having instructions embodied therein that, when executed, cause one or more processors to:

receive a selection of a first sub-branch of a parent branch of a graphical selection tree, wherein:
the parent branch of the graphical selection tree is associated with a data dimension,
the first sub-branch is associated with a generic data attribute associated with the parent branch of the graphical selection tree,
the second sub-branch is added as a sub-branch of the parent branch of the graphical selection tree after the selection of the first sub-branch, and
the second sub-branch is a specific instance of the generic data attribute associated with the parent branch of the graphical selection tree;

responsive to the selection of the first sub-branch of the parent branch of the graphical selection tree, automatically select, without receiving user input to select the second sub-branch of the parent branch of the graphical selection tree, the second sub-branch of the parent branch of the graphical selection tree; and generate a query to request, from a data storage system, data for each selected data metric that matches the specific instance of the generic data attribute corresponding to one of a plurality of selected sub-branches, wherein the plurality of selected sub-branches includes the automatically selected second sub-branch.

16. The computer-readable memory of claim 15, wherein the instructions, when executed, further cause the one or more processors to:

display the graphical selection tree within a graphical user interface (GUI);

for each branch in the graphical selection tree that is selected, receive a data response from the data storage system containing data of the selected metric that matches the specific instance of the generic data attribute corresponding to the selected branch, wherein the data response includes data of the selected metric that matches the specific instance of the generic data attribute corresponding to the automatically selected second sub-branch; and update the GUI to include the data of the selected metric that matches the specific instance of the generic data attribute corresponding to the selected branch.

17. The computer-readable memory of claim 16, wherein the instructions, when executed, further cause the one or more processors to:

display each data response in a graphical dashboard window to update one or more real-time data views within the graphical dashboard window that is continuously updated over time to provide a current snapshot of a current state of the data of the selected data metric;

responsive to a change in the current state of the data of the selected data metric, receive a stream of data that includes the current state of the data of the selected data metric; and update the graphical dashboard window to provide the received current state of the data of the selected data metric.

18. A device comprising:

one or more processors;

a data selection component executable by the one or more processors to:
receive a selection of a first sub-branch of a parent branch of a graphical selection tree, wherein:
the parent branch of the graphical selection tree is associated with a data dimension,
the first sub-branch is associated with a generic data attribute associated with the parent branch of the graphical selection tree,
a second sub-branch is added as a sub-branch of the parent branch of the graphical selection tree after the selection of the first sub-branch, and
the second sub-branch is a specific instance of the generic data attribute associated with the parent branch of the graphical selection tree; and
automatically select, responsive to the selection of the first sub-branch of the parent branch of the graphical selection tree and without receiving user input to select the second sub-branch of the parent branch of the graphical selection tree, the second sub-branch of the parent branch of the graphical selection tree; and a query engine executable by the one or more processors to generate a query to request, from a data storage system, data for each selected data metric that matches the specific instance of the generic data attribute corresponding to one of a plurality of selected sub-branches, wherein the plurality of selected sub-branches includes the automatically selected second sub-branch.

19. The device of claim 18, wherein:
the data selection component is further operable to receive user input to navigate through and select one or more of the branches in the graphical selection tree; and
the query engine is further operable to send the generated query to a data storage system.

20. The device of claim 18, wherein generating the query to request data for each selected data metric that matches the specific instance of the generic data attribute corresponding to one of the plurality of selected sub-branches further comprises generating, for the selected sub-branch, the query that matches the specific instance of the generic data attribute corresponding to the selected sub-branch and that further matches the data attribute corresponding to the parent branch.

21. The device of claim 18, wherein the data selection component is further operable to receive user input to select a view type for one or more data views in a graphical dashboard window, the view type being associated with types of branches that are included within the graphical selection tree, the device further comprising a data display component executable by the one or more processors to display the one or more data views within the graphical dashboard window of the selected view type.

22. The device of claim 18, further comprising a data display component executable by the one or more processors to display the graphical selection tree within a graphical user interface (GUI),
wherein the query engine is further executable to receive, for each branch in the graphical selection tree that is selected, a data response from the data storage system containing data of the selected metric that matches the data attribute corresponding to the selected branch, wherein the data response includes data of the selected metric that matches the data attribute corresponding to the automatically selected second sub-branch, and
wherein the data display component is further executable to update the GUI to include the data of the selected metric that matches the data attribute corresponding to the selected branch.

23. The device of claim 22, wherein:
the data display component is further executable to display each data response in a graphical dashboard window to update one or more real-time data views within the graphical dashboard window that is continuously updated over time to provide a current snapshot of a current state of the data of the selected data metric;
the query engine is further executable to receive, responsive to a change in the current state of the data of the selected data metric, a stream of data that includes the current state of the data of the selected data metric; and
the data display component is further executable to update the graphical dashboard window to provide the received current state of the data of the selected data metric.

* * * * *